United States Patent [19]

Bablo

[11] Patent Number: 5,651,653

[45] Date of Patent: Jul. 29, 1997

[54] HAYROLL HANDLING DEVICE

[76] Inventor: Noel Bablo, 10485 Rogers Rd., Corning, N.Y. 14830

[21] Appl. No.: 649,496

[22] Filed: May 17, 1996

[51] Int. Cl.$^6$ ........................................ B60P 1/64
[52] U.S. Cl. .................... 414/24.5; 414/912; 414/786
[58] Field of Search .............................. 414/24.5, 24.6, 414/685, 786, 721, 723, 912, 920

[56] References Cited

U.S. PATENT DOCUMENTS

| | | |
|---|---|---|
| 3,921,837 | 11/1975 | Vandewater . |
| 4,099,629 | 7/1978 | Cox . |
| 4,256,426 | 3/1981 | Buss ........................... 414/24.5 |
| 4,583,900 | 4/1986 | Cooley ........................ 414/24.5 |
| 4,674,786 | 6/1987 | Lynch ......................... 294/120 |
| 4,674,933 | 6/1987 | Brown ........................ 414/24.6 |
| 4,790,558 | 12/1988 | Ellis ............................ 280/481 |
| 5,064,338 | 11/1991 | Lawrence ................... 414/685 |
| 5,106,253 | 4/1992 | Wedin ........................ 414/24.5 |
| 5,275,314 | 1/1994 | Todenhagen ............... 224/42.01 |

FOREIGN PATENT DOCUMENTS

| | | |
|---|---|---|
| 1063979 | 10/1979 | Canada . |
| 1189030 | 6/1985 | Canada . |
| 1548029 | 7/1979 | United Kingdom . |
| 2191752 | 12/1987 | United Kingdom . |

Primary Examiner—Karen B. Merritt
Assistant Examiner—Janice L. Krizek
Attorney, Agent, or Firm—Richard C. Litman

[57] ABSTRACT

A hayroll handling device comprises a hayroll or bale spear secured to the snowplow headgear mounted on a light truck or the like. The snowplow blade and associated lifting arm are removed from the headgear, which is permanently mounted on the vehicle. The first end of the spear is then pivotally mounted to the headgear at the pivotal attachment point for the removed blade lifting arm, and the spear is also secured to the upper end of the plow blade lift hydraulic cylinder or ram, which remains with the headgear after removal of the blade and lift arm. The vehicle and attached spear may then be used to impale a large hayroll or the like, with the existing plow blade lifting hydraulics being used to lift the spear and impaled roll or bale, so the vehicle may be driven to transport the roll to a livestock feeding station or other area as desired. The spear may be provided in any practicable length with a pointed tip at the distal second end, in order to provide optimal penetration of the hayroll. The spear may be made from solid rod or hollow tubular stock, in round, rectangular, or other cross sectional shapes, as desired. The device provides further seasonal utility for the snowplow hydraulic mechanism and structure, and is easily installed, as normally the plow blade is removed from the vehicle during the spring, summer, and fall in any case.

9 Claims, 3 Drawing Sheets

HAYROLL HANDLING DEVICE

BACKGROUND OF THE INVENTION

1. Field of the Invention

The present invention relates generally to mechanized agricultural tools and implements, and more specifically to a spear-like implement adapted to be removably attachable to the headgear and hydraulic lifting mechanism of a light snowplow assembly, as adapted for use on a light truck or the like. The snowplow blade and lifting arm are removed from the headgear, and the hayroll or bale spear is installed in place of the plow blade lifting arm. The truck may then be used to drive the spear into a large hayroll, with the hydraulic lifting mechanism used to lift the spear and impaled hayroll from the ground or other surface to transport the hayroll to another location as required.

2. Description of the Prior Art

With the mechanization and automation of farm and agricultural equipment and operations since the advent of the industrial age, the size and mass of bulk quantities of the end products produced, has generally increased over the years. An example of the above is in the handling of hay from its harvest point in the field, to another location for storage or use.

Initially, when farm operations were almost entirely handled manually, hay was bundled into shocks which were easily handled by a single farm hand for placement on a wagon for removal from the field. Later, mechanized equipment was developed which automatically baled the hay into relatively large bales which were about at the limit for a single, strong individual to handle. As the handling process was largely mechanized, this generally was not a problem. However, with increasing automation and mechanization, it has become common for hay to be rolled into very large hayrolls or bales, which are far larger than can be handled by even a few strong individuals. These bales may have a diameter on the order of five or six feet and may weigh up to 1500 pounds or more, depending upon the moisture content of the hay and other factors. (While these large rolls are still called "bales," the term "hayroll" is used throughout the present disclosure, in order to distinguish such large rolls of hay from smaller bales having a rectangular solid form.)

Obviously, these large rolls require some form of mechanized equipment for handling. Accordingly, various implements have been developed, such as tines or tine assemblies which may be attached to a conventional tractor, and which may be used to impale a hayroll for movement of the roll from one location to another. However, most of these are limited, in that (1) they require a tractor or front end loader, and (2) such tines must be mounted to the rear of the tractor, or to the front of an end loader bucket, for lifting, and thus the view of the operator is obscured.

Such devices as installed directly to the front of a tractor (as opposed to their installation on other forwardly installed hydraulic equipment) have no means for lifting the hayroll once it has been impaled, as the hydraulics and power takeoffs for tractor are always provided at the rear of the machine. The installation of forwardly mounted hydraulic equipment on tractors, requires additional hydraulic lines and structure. Moreover, no such devices have been adapted to use the hydraulics of light snowplows, as installed on the front of light trucks and similar vehicles.

The present invention provides additional utility during the farming season for such plow mechanisms. The plow mechanism is easily adapted for use with such a hayroll handling mechanism, as the plow blade is generally removed from the apparatus and vehicle during the spring, summer, and fall, anyway. A review of the prior art below reveals other hayroll handling tines, but none which may be used with a snowplow hydraulic headgear assembly secured to the front of a light truck or the like, as in the present invention.

U.S. Pat. No. 3,921,837 issued to Lloyd L. Vandewater on Nov. 25, 1975 describes a Round Bale Handling Attachment For A Tractor, wherein a pair of sockets is installed to the top of an end loader bucket, with a pair of tines removably installed in the sockets. The bucket must be installed on the tractor for use in handling hayrolls, thus precluding use of the tractor for other purposes. Moreover, the tractor is strictly an agricultural vehicle, and cannot be used for other purposes, as a truck using the present apparatus.

U.S. Pat. No. 4,099,629 issued to Randal A. Cox on Jul. 11, 1978 describes a Hay Bale Handling Machine principally comprising a frame which is mounted within the bed of a conventional pickup truck. A hydraulic cylinder is provided, which drives a single tine or spear through a 90 degree vertical arc. The truck is backed into the bale or roll, and the hydraulics actuated to position the roll vertically over the truck bed for transport. The device and operation are relatively cumbersome, as the pickup truck cannot be used for other purposes with the assembly bolted into the bed, and the driver must back the truck to impale a roll, rather than driving the truck forward, a maneuver more easily accomplished as with the present invention. Moreover, Cox requires additional hydraulic means to the back of the truck, which complicates the mechanism further. Cox also discloses the attachment of an alternative embodiment on the rear three point hitch of a tractor, which is beyond the scope of the present invention.

U.S. Pat. No. 4,256,426 issued to Merle D. Buss on Mar. 17, 1981 describes a Tractor Mounted Round Bale Carrier comprising a frame which is essentially permanently mounted to the front of a tractor. The frame includes tracks for a hydraulically operated tine carrier, which is lifted upwardly and arcuately rearwardly by a hydraulic cylinder. Additional hydraulic means must be provided, as the conventional tractor would not normally have such hydraulic means disposed forwardly. The present device is easily installable and removable from a snowplow equipped pickup truck or the like, thereby allowing the truck to be used for other purposes.

U.S. Pat. No. 4,583,900 issued to Nickolas A. Cooley on Apr. 22, 1986 describes a Round Hay Bale Handling Apparatus Having At Least One Screw Spear. The apparatus is attachable to a tractor having hydraulic power, as the spear (s) is/are rotated to engage the rolled bale by threadingly screwing into the bale. However, Cooley is silent insofar as any means to pick up the rolled bale once it has been impaled with the screw(s). Also, the device is relatively complex, as some means must be provided to rotate the screw(s), which means is beyond the scope of a snowplow hydraulic system as used in the present invention. To use the Cooley device on a pickup truck or the like having a snowplow installed thereon, the entire plow headgear must be removed, including the hydraulic power pack. Cooley does not anticipate the use of his device on a vehicle not equipped with a hydraulic pump, as he does not disclose any electric motor drive for the hydraulic motor(s) of his device. Thus, one would have to come up with some form of electric power pack in order to drive the Cooley hydraulics, after removing the snowplow headgear which is normally equipped with such a unit.

U.S. Pat. No. 4,674,786 issued to Bobby R. Lynch on Jun. 23, 1987 describes a Hay Bale Spike Assembly primarily directed to providing the required attachment strength for the spike to the frame. Lynch describes his frame as being attachable to the lift mechanism of a farm tractor, but is otherwise silent insofar as the specific means of lifting a rolled bale with the spike. If the apparatus were used to replace the headgear with its hydraulics on a pickup truck, no means would be available to lift the spike.

U.S. Pat. No. 4,674,933 issued to Ronald D. Brown on Jun. 23, 1987 describes a Hay Tote Vehicle, i.e., a pickup truck having a special rear bumper driven by a hydraulic ram to rotate about its axis. The bumper includes a pair of spikes extending therefrom. The pickup truck is backed into a hay bale, thus driving the horizontally disposed spikes into the bale, and the cylindrical bumper is rotated to lift the spikes through an arc and raise the bale. The disadvantage of having to back a vehicle to impale a bale on rearwardly disposed spikes, has been noted further above. Also, Brown fails to mention any source for his hydraulic power. Normally, light trucks such as pickups are not provided with auxiliary hydraulic power at the time of manufacture, but a hydraulic power pack is added with the installation of any devices requiring such (as in a snowplow). Thus, the Brown apparatus would require considerably more structure than that disclosed in his issued patent, in order to be operable.

U.S. Pat. No. 4,790,558 issued to Jerald C. Ellis on Dec. 13, 1988 describes a Front Mounted Bale Carrier Assembly, closely resembling a small front end loader attachment for a tractor. Rather than having a bucket, however, Ellis provides a pair of tines adapted to engage a rolled bale. The apparatus would still require some form of hydraulic power, from the back of the tractor to the forwardly mounted lift cylinder. The present invention makes use of the previously installed hydraulic power pack and lift cylinder(s) of the snowplow headgear already mounted on the vehicle, and does not require any other hydraulics.

U.S. Pat. No. 5,275,314 issued to Fred Todenhagen on Jan. 4, 1994 describes a Front-Mounted Spare Tire Rack For Snowplow Headgear. The Todenhagen device provides an additional use for the snowplow headgear at other times of the year, but no moving parts or hydraulic actuation is required; rather, the conventional spare tire is removably affixed to the modified snowplow headgear. Todenhagen requires the hydraulic power pack to be removed from the headgear, including disconnection of hydraulic lines therefrom. Thus, the Todenhagen apparatus could not be used to lift any portion of the plow assembly and/or any attachments thereto, such as the present hayroll spear, since all the hydraulics are removed.

Canadian Patent No. 1,063,979 issued to Gary McCullough on Oct. 9, 1979 describes a Vehicle Mounted Bale Lifter wherein the apparatus is mounted in the bed of a pickup truck. The hayroll spear component is secured near the lower rear edge of the bed, and pivots about a lateral axis. The upper end of the spear component has a draw arm which may be pulled downwardly and forwardly by a cable actuated winch, thereby lifting the hayroll spears upwardly. The device requires essentially the entire space of the pickup bed, and thus is not adaptable to attachment to the front of the truck, as in the present invention. No existing, previously installed snowplow headgear and/or hydraulic components are used in the McCullough device. The disadvantage of rearwardly mounted bale handling devices, and the relative difficulty in maneuvering the vehicle for operation thereof, has been noted further above.

Canadian Patent No. 1,189,030 issued to William G. Elynuik on Jun. 18, 1985 describes an Adjustable Round Bale Holder Or Loader For Front End Loaders. The device comprises a frame having a tine or tines removably mounted thereon, with the frame being removably attached to the operating arms of a front end loader. As such, the loader bucket must be removed, somewhat in the manner of the removal of the snowplow blade from the snowplow headgear in order to use the present invention. However, end loader buckets are not normally removed seasonally, as are snowplow blades, and thus the operation would be somewhat more involved to use the Elynuik device. Moreover, the device cannot be used with a pickup truck or the like, as front end loaders are not adapted for use with such trucks, in that neither the loader bucket and actuating arms nor the truck would normally be provided with an integral hydraulic power system.

British Patent Publication No. 1,548,029 to R. A. Lister Farm Equipment Ltd. and published on Jul. 4, 1979 describes an Apparatus For Handling Bales Or The Like, comprising a frame and lifting arms attachable to the front or rear end of a tractor. Again, as tractors conventionally include hydraulic pumps, power takeoffs, etc. as standard integral components, no disclosure of any hydraulic power means serving to actuate the disclosed hydraulic cylinders, is provided in the Lister Farm Equipment publication. The device is not adaptable for installation with an existing snowplow headgear assembly already installed on a pickup truck or the like, as provided by the present invention.

Finally, British Patent Publication No. 2,191,752 to John B. Williams and published on Dec. 23, 1987 describes a Bale Handling Device which provides for the wrapping of a cylindrical bale in plastic for preservation. The device attaches to a conventional three point hitch linkage of a tractor, which serves to lift the apparatus and any hayroll impaled thereon. The tractor power takeoff then spins the rolled bale tines and bale, to wrap the plastic sheet around the bale. The improvement in the Williams device is a safety clutch which serves to disengage the rotary action of the tines when the assembly is lowered. While the Williams device could be used for the transport of hayrolls, it is not adaptable to the snowplow headgear of a pickup truck, and no means is provided to secure a single tine directly to the lifting apparatus, as provided by the present invention.

None of the above inventions and patents, taken either singly or in combination, is seen to describe the instant invention as claimed.

SUMMARY OF THE INVENTION

Accordingly, it is a principal object of the invention to provide an improved hayroll handling device comprising an elongate spear which is adapted for removable attachment to the headgear of a vehicle mounted snowplow assembly, and which is positionally adjustable through a vertical arc by means of the existing plow blade lift cylinder of the snowplow assembly to provide for the impaling and lifting of a rolled hay bale for transport thereof.

It is another object of the invention to provide an improved hayroll handling device which hayroll or bale spear may comprise a hollow tube or solid rod of cylindrical, square, or other section as desired, and which includes a tapered point for optimum penetration of the roll or bale, as well as adaptor plates and attachment means providing for the attachment of the spear to the plow blade lift cylinder and plow headgear frame.

It is a further object of the invention to provide an improved hayroll handling device in combination with a vehicle mountable snowplow headgear frame and hydraulic means therewith.

An additional object of the invention is to provide an improved method of converting a vehicle mounted snowplow for use as a hayroll handling device.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
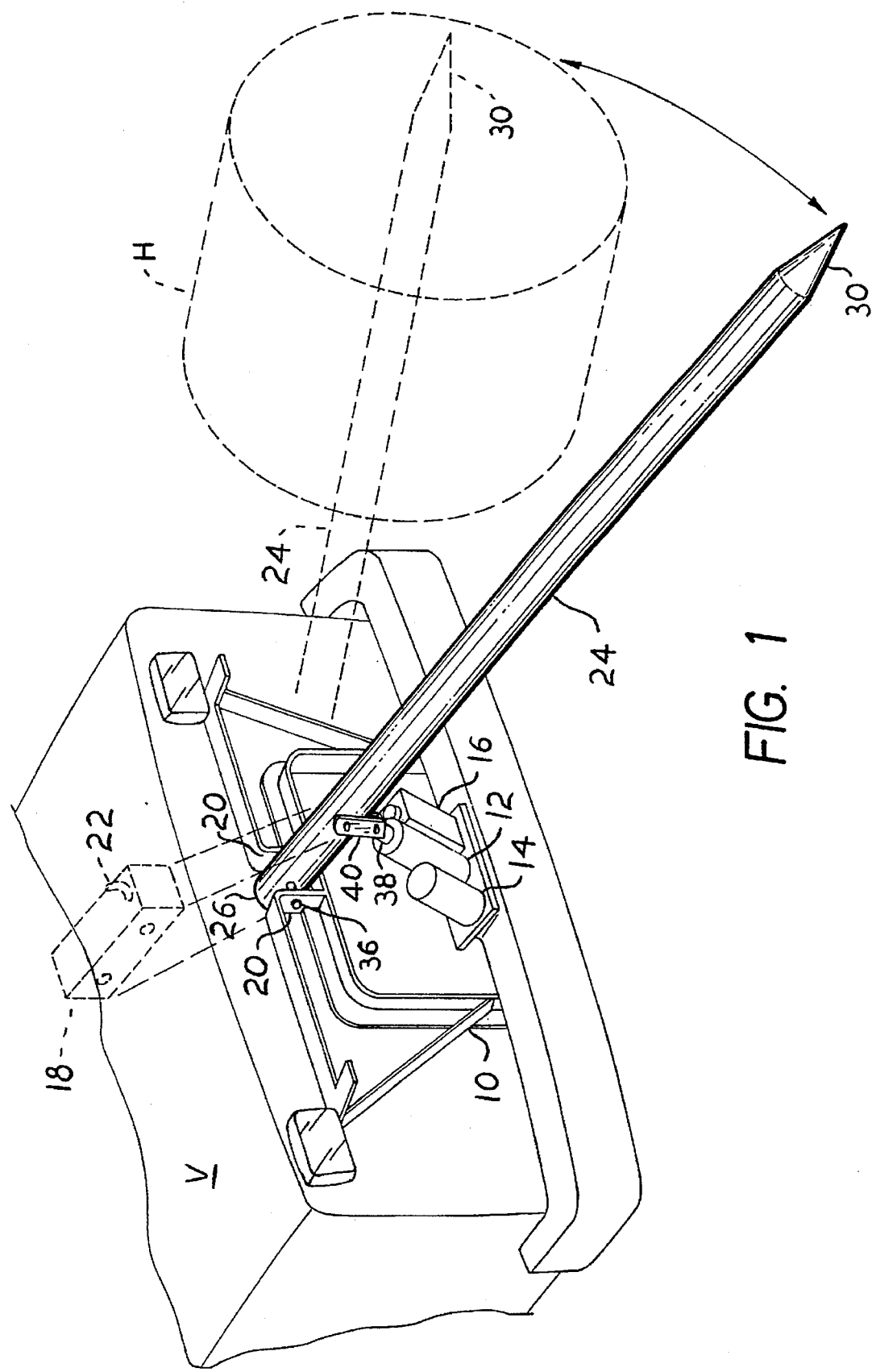
FIG. 1 is a perspective view of the present hayroll handling device mounted on a snowplow headgear attached to a light truck or the like, showing the removal of the plow blade lifting arm from the headgear and also showing the arcuate movement of the spear.

The present invention comprises a hayroll handling device, providing for the lifting and movement of large rolled hay bales by a conventional motor vehicle having a conventional hydraulically actuated snowplow apparatus. FIG. 1 provides an overall view of the apparatus, and its operation. In FIG. 1, a motor vehicle V, such as a pickup, light truck, or other suitable vehicle, is equipped with a hydraulic snowplow apparatus installed to the front end of the vehicle V. The snowplow apparatus generally comprises a frame or headgear 10 and a hydraulic system, with the hydraulic system including a hydraulically actuated cylinder 12, which receives hydraulic fluid under pressure from an electrically powered hydraulic pump 14. Hydraulic fluid is provided in a reservoir 16. (Connecting hydraulic lines have been omitted for clarity in the drawing figure.) The above described components are generally conventional, and it will be seen that other arrangements may be used.

During the snowy season, the snowplow apparatus will normally be equipped with a snowplow blade (not shown), which is secured to a left and right mounting point beneath the front of the vehicle V by means of additional hydraulic struts (not shown) to provide for angling the plow blade to the left or right as desired. The controls (not shown) to angle the blade and to raise and lower the blade are essentially permanently installed in the cab of the vehicle V. The blade, blade mounting, and hydraulic controls providing for the adjustment of the blade, are all conventional and well known, and are beyond the scope of the present invention.

A snowplow blade lifting arm 18, shown in broken lines and removed from the remainder of the headgear 10 in FIG. 1, is pivotally secured to the top of the headgear 10 by means of a pin or bolt which is inserted laterally through concentric passages in the arm 18 and also in a pair of spaced apart lifting arm attachment points 20. The arm 18 is lifted as desired by the hydraulically powered ram of the hydraulic cylinder 12.

The arm 18 includes a chain (not shown) secured to a hook 22, slot, or other anchoring means near the forwardmost end of the lift arm 18. This chain in turn connects to the back of the snowplow blade, and when the hydraulic ram is raised by means of a control (not shown) in the cab of the vehicle V, the chain is pulled upwardly to lift the blade attached thereto. Release of the hydraulic pressure in the cylinder 12 allows the blade to drop due to its weight.

The above description is conventional, and is typical for most such plow apparatus, although details may vary between different manufacturers and models. It will be seen that the snowplow blade is thus very easy to remove from the vehicle V, with only the two pins/bolts securing the lower left and right sides of the blade and the chain connecting the blade to the lift arm 18, needing to be disconnected to remove the entire blade from the headgear assembly 10 and vehicle V. Accordingly, when warmer temperatures arrive and the blade is no longer required, as during the spring, summer, and fall, it is customary to remove the snowplow blade from the headgear assembly 10 and vehicle V. This is normally reasonably easily accomplished, as the blade must be removed from time to time so the vehicle V may be used for other purposes, even in winter.

Accordingly, the snowplow headgear 10, along with its hydraulic actuation means, is essentially excess weight on the vehicle V during most of the year. While it might be removed, the removal would be considerably more cumbersome and time consuming than merely removing the blade, as discussed above, and generally not worth the trouble for most people. The present invention provides additional utility for the snowplow headgear 10 and hydraulics, by allowing the apparatus to be used in the lifting and transport of large and heavy hayrolls, or rolled bales of hay, to provide further utility for the snowplow apparatus at least after the hay or grass crop has been cut and rolled. Moreover, no costly specialized mechanized equipment need be purchased for handling such rolls, when using the present invention.

Figure 2:
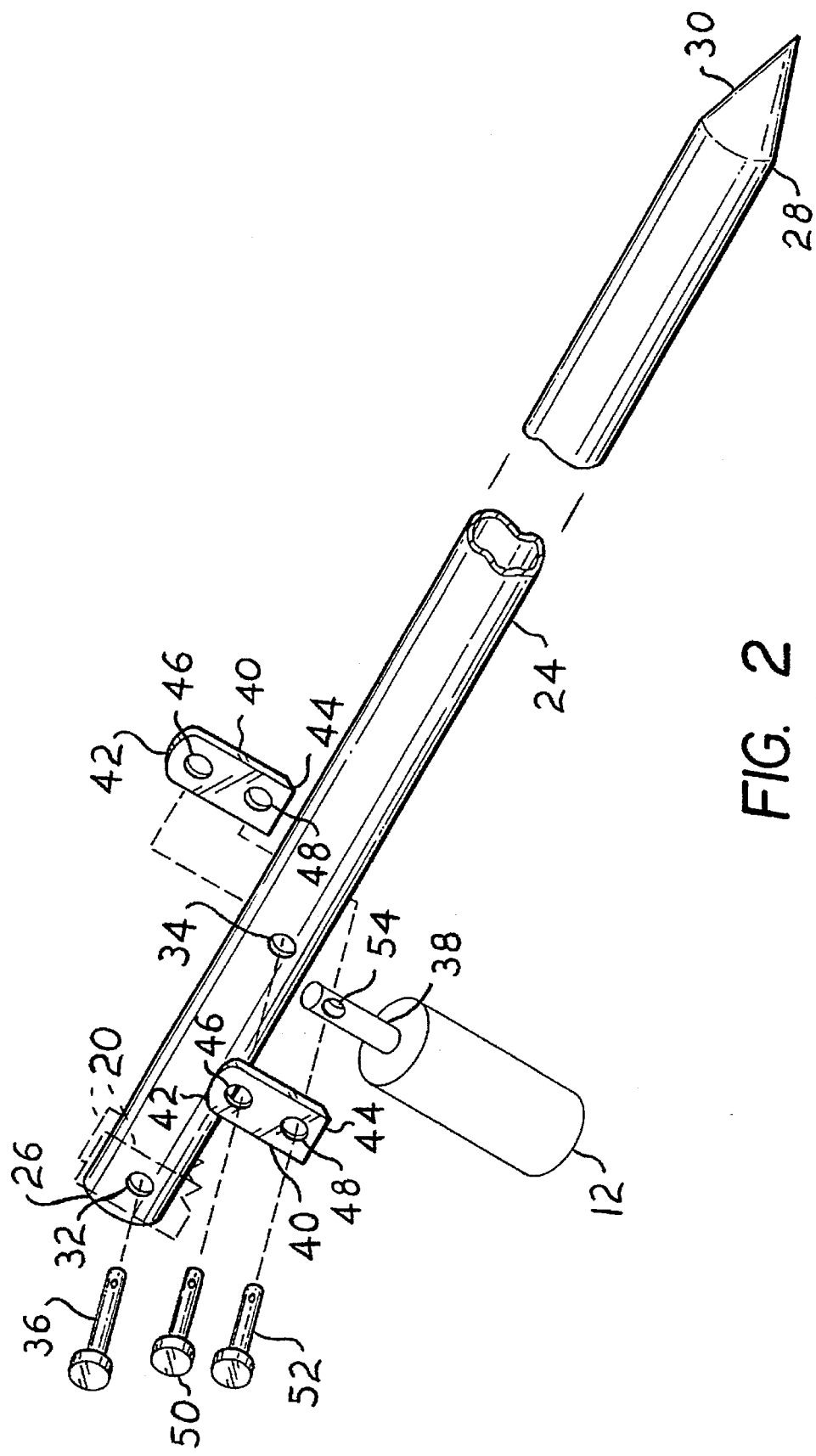
FIG. 2 is an exploded perspective view of the hayroll spear, showing the means of attaching the spear to the plow blade lift cylinder and lift arm attachment point of the snowplow headgear.

The present invention provides a hayroll spear 24, which is adapted to be removably installed on the snowplow headgear assembly 10 once the snowplow blade and lifting arm 18 have been removed from the headgear 10. FIG. 2 provides a more detailed view of the specific structure of the hayroll spear 24, along with the means for its removable attachment to the snowplow headgear assembly 10 and hydraulic ram.

The spear 24 may be in the form of hollow steel tubular elongate stock of cylindrical cross section, as shown in FIG. 2, or may alternatively comprise hollow or solid members of various cross sections, some of which are disclosed further below. The spear 24 has a first end 26, which is adapted for attachment to the snowplow headgear 10 and hydraulic ram, and an opposite second end 28, which terminates in a tapered point 30. The first end 26 includes a first lateral passage 32 immediately adjacent the first end 26, and a second lateral passage 34 which is axially parallel to and displaced from the first passage 32, but still near the first end 26 of the spear 24. The first end 26 of the spear 24 is placed between the two lift arm attach points 20 and pivotally pinned in place therebetween by a first pin 36 (clevis pin, pip pin, bolt, etc.) after the lifting arm 18 has been removed from the plow headgear 10. (The same pin which is used to secure the lifting arm 18 between the two attach points 20 may be used to secure the first end 26 of the spear 24 between the attach points 20, if desired.)

The spear 24 is secured to the hydraulic ram 38 projecting from the hydraulic cylinder 12 by a pair of substantially identical lifting ram attachment plates 40, with each of the plates 40 having a first end 42 and an opposite second end 44. A first passage 46 and a second passage 48 are formed through each of the plates 40, respectively adjacent the first end 42 and second end 44. The attachment plates 40 are secured to the hayroll spear 24 by passing a second pin 50 through the first passages 46 of each of the plates 40 and also through the second passage 34 of the spear 24, with the spear 24 sandwiched between the two plates 40. Again, the pin 50 may be a conventional threaded bolt with a cooperating nut used for security, or alternatively a clevis pin as shown and a securing hitch pin (not shown), a pip pin, or other means as desired.

The opposite second ends 44 are secured to the hydraulic ram 38 by means of a third pin 52 (clevis, bolt, etc.) which is passed through the second holes or passages 48 of the two plates 40 and also through the lateral passage 54 in the end of the hydraulic ram 38. The end of the ram 38 is sandwiched between the two plates 40, so the ram 38 and spear 24 are axially coplanar.

The above described assembly will be seen to operate much like the conventional snowplow blade lifting arm 18, which was removed for the installation of the spear 24. The first end 26 of the spear 24 is pivotally affixed between the lift arm attachment points 20 of the headgear 10, with the hydraulic ram 38 serving to lift the spear 24 at the second passage 34, thus lifting the distal second end 28 as desired.

Figure 3A:
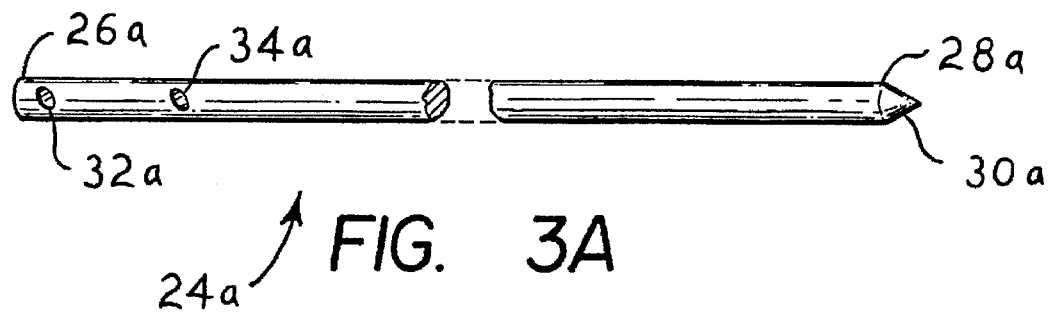
FIGS. 3A through 3C disclose alternative spear embodiments, respectively a solid cylindrical rod, a hollow rectangular section tube, and a solid rectangular section rod.
Figure 3B:
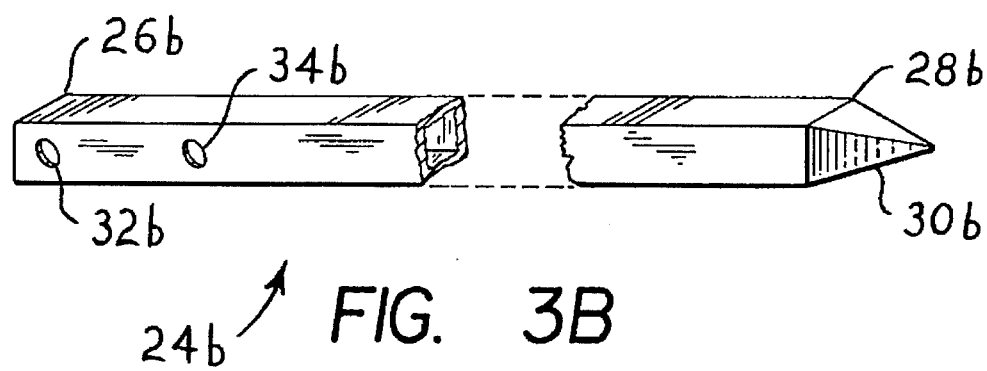
Figure 3C:
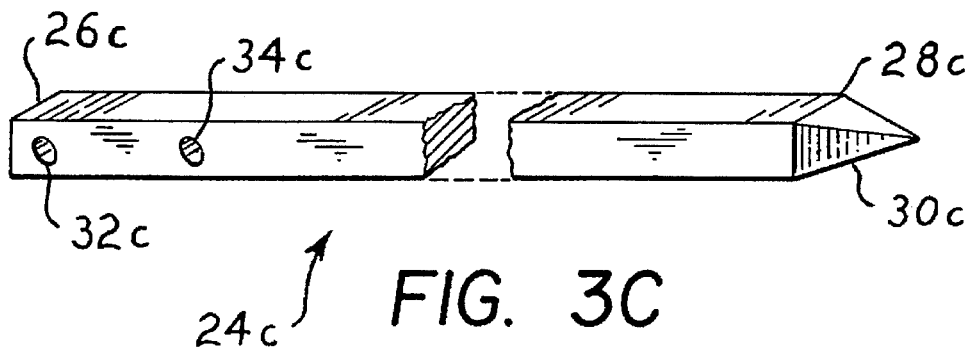

FIGS. 3A, 3B, and 3C disclose alternative configurations for the spear 24, respectively designated as spears 24a, 24b, and 24c in FIGS. 3A/3B/3C. Each of the hayroll spears 24 through 24c is essentially similar, respectively comprising an elongate steel component having a first end, respectively 26 through 26c, an opposite second end 28 through 28c, and a tapered point 30 through 30c. A first lateral passage, respectively 32 through 32c, is provided adjacent their respective first ends 26 through 26c, in the manner described further above for the hayroll spear 24 of FIGS. 1 and 2. A second lateral passage 34 through 34c is displaced from the respective first lateral passage 32 through 32c, in each of the spears 24 through 24c.

The primary differences between the various spear configurations disclosed in the various drawing figures, is that the spear 24a of FIG. 3A is formed of a solid rod, rather than being a hollow tube. The spear 24a is still of a circular cross section, however. It will be seen that the use of a solid rod or bar stock for the spear 24a will allow the diameter to be reduced somewhat, although there will be some additional weight penalty. The spear 24b of FIG. 3B is formed of hollow, rectangular (or square) section tube material, with a strength to weight ratio similar to that of the spear 24 having a hollow round section. The spear 24c of FIG. 3C is formed of solid square or rectangular section bar stock. Other hollow or solid cross sections may be used as desired, e.g., U-shaped channels, welded up L-sections, etc., so long as sufficient strength is provided.

The present hayroll handling device is used essentially as described further above, with the snowplow blade being removed from the snowplow headgear 10 once its seasonal need has passed. The lifting arm 18 may also be removed when the blade is removed, as desired. Once the hay has been rolled in the field and it is desired to move it to another location, one of the present hayroll spears 24 through 24c is installed on the snowplow headgear 10 as described above, i.e., by removing the lifting arm 18 from the headgear 10 if such has not been done at the time the snowplow blade was removed. One of the spears 24 through 24c is then installed by aligning the first passage 24 through 24c thereof between the two lifting arm attachment points 20 of the headgear 10, and inserting the first pin 36 therethrough.

The two lifting ram attachment plates 40 are installed on each side of the spear 24 through 24c by means of the second pin 50 and the second spear passage 34 through 34c, with the second pin 50 passing through each of the first passages 46 of the two plates 40 and with the spear 24 through 24c sandwiched between the plates 40. (The plates 40 may be left permanently assembled on the spear if desired, to simplify the spear installation procedure.)

The two plates 40 are then used to connect the spear 24 through 24c to the lifting ram 38 of the hydraulic cylinder 12, by aligning the ram passage 54 between the two second passages 48 of the two plates 40, and installing the third pin therethrough. The above described procedure need only take a minute or so, and no hydraulics need be disconnected.

At this point, the vehicle V and its snowplow headgear 10 with the spear 24/24a/24b/24c extending therefrom, may be driven to a hayroll (e.g., the hayroll H shown in broken lines in FIG. 1) to be moved to another location. The spear 24 (or one of its other embodiments 24a through 24c) is raised to a generally horizontal position, or to about the height of the center of the hayroll H, by means of the conventional snowplow blade hydraulic control in the vehicle cab, used for lifting the blade with the hydraulic cylinder 12 and ram 38. The spear 24 extending forwardly of the vehicle V is aligned generally with the cylindrical axis of the hayroll H, and the vehicle V is driven forward to cause the spear 24 (or other embodiment) to penetrate and impale the hayroll H thereon, by means of the tapered point 30 at the distal second end 28 of the spear 24.

Typically, the generally cylindrical configuration of such hayrolls H have a length on the order of about four feet, and it has been found that an overall length of about fifty two inches for the spear 24/24a/24b/24c, including the respective point 30/30a/30b/30c, is sufficient to support a hayroll H reasonably securely thereon. The second passage 34 of the spear 24 is about 6⅝ inches from the first end 26 of the spear (variable depending upon the specific headgear configuration), thus providing a hayroll supporting length of about 45⅜ inches, including the tip 30 of the spear 24. Other lengths may be provided as desired, depending upon the size and depth of the hayrolls H being transported, the strength of the headgear and hydraulics, etc.

Once the hayroll H is impaled upon the spear 24, the spear is lifted further using the conventional hydraulic blade lift control in the vehicle cab. Once the hayroll H is clear of the ground, the vehicle with its forwardly impaled hayroll H load may be driven to the desired destination (feeding station, etc.) for the hayroll H. While the present invention does not provide complete support for the hayroll H for highway transportation, it will be seen that it provides a most convenient means of transporting a hayroll H from one point to another on a farm, or between adjacent farms, or even for short distances on rural or farm roads, if required.

When the destination has been reached, the spear 24 is lowered by releasing the hydraulic pressure in the cylinder 12, by means of the control in the cab of the vehicle V. Once the hayroll H is resting on the surface at the desired location, the vehicle V may be backed up to withdraw the spear 24 from the hayroll H, and the process repeated as required with additional trips made as desired.

Once the present hayroll handling device is no longer needed, the spear 24 (or other embodiments 24a/24b/24c) may be quickly and easily removed from the plow headgear 10 and hydraulic ram 12, by removing respectively the first and third pins 36 and 52. The spear 24, with the lifting ram attachment plates 40 remaining attached thereto if desired, may then be placed in storage until needed again in the future. The entire spear removal operation may be accomplished even more rapidly than the installation process, with the spear removal procedure requiring perhaps a minute or less.

In summary, the present hayroll handling device will be seen to provide a most convenient and economical means for a person to transport large rolled bales of hay, grass or the like from one point to another on the farm, or between one point and any nearby area. In view of the typical farm economy, it is most important that equipment and machinery be capable of performing more than one specialized task, for optimum efficiency. Heretofore, the snowplow apparatus and associated hydraulics mounted on a pickup truck or other suitable vehicle, merely added dead weight to the vehicle for perhaps eight or more months of the year. The present invention provides an excellent means of utilizing the existing plow headgear and hydraulics mounted on a vehicle, for other purposes during other parts of the year, and thus precludes any requirement for the purchase of specialized hayroll handling equipment for the farm. Accordingly, the present invention will be seen to be highly desirable by those who have need to move such large rolls of hay, and who already have a vehicle with snowplow attachments fitted thereto.

It is to be understood that the present invention is not limited to the sole embodiments described above, but encompasses any and all embodiments within the scope of the following claims.

I claim:

1. A hayroll handling device, comprising:

an elongate hayroll spear having a first end and an opposite second end, with said first end of said spear being adapted for removable and pivotal attachment to a plow blade lifting arm attachment point and a hydraulic lifting ram of a vehicle snowplow headgear structure, respectively by means of a first lateral passage through said spear and adjacent said first end and a second lateral passage through said spear near said first end and displaced from said first lateral passage, and with said second end of said spear having a tapered point thereon and being adapted for the penetration and impaling of a hayroll thereon;

a pair of substantially identical lifting ram attachment plates, with each of said attachment plates having a first end and an opposite second end, with a first passage and a second passage formed therethrough respectively adjacent said first end and said second end, and;

a first, a second, and a third attachment pin, with said first pin being removably installable through said first lateral passage to secure said spear pivotally to the plow blade lifting arm attachment point, said second pin being removably installable through each said first passage of said attachment plates and said second lateral passage of said spear to secure said attachment plates to said spear and to sandwich said spear between each said first end of said plates, and said third pin being removably installable through each said second lateral passage of said attachment plates to secure said plates pivotally to the hydraulic lifting ram of the vehicle snowplow headgear structure and to sandwich the ram between each said second end of said plates, whereby;

said spear is removably and pivotally secured to the vehicle mounted snowplow headgear structure and plow blade lifting ram after removal of the plow blade and lifting arm from the headgear structure, and said spear is used to penetrate and impale a hayroll by means of maneuvering the vehicle accordingly, with the hayroll being lifted from an underlying surface for transport by the vehicle by arcuately lifting said spear by means of the hydraulic lifting ram of the snowplow headgear.

2. The hayroll handling device according to claim 1, wherein:

said spear has a length of substantially fifty two inches including said tapered point thereof.

3. The hayroll handling device according to claim 1, wherein:

said spear is formed of elongate stock selected from the group consisting of hollow tubular material having a cylindrical cross section, solid rod material having a cylindrical cross section, hollow tubular material having a rectangular cross section, and solid rod material having a rectangular cross section.

4. A hayroll handling device and vehicle attachment and lifting structure therefor, comprising in combination:

an elongate hayroll spear having a first end and an opposite second end, with said first end of said spear having a first lateral passage through said spear and adjacent said first end, and a second lateral passage through said spear near said first end and displaced from said first lateral passage, and with said second end of said spear having a tapered point thereon and being adapted for the penetration and impaling of a hayroll thereon;

an attachment and lifting structure for said hayroll spear, comprising a snowplow headgear structure adapted for mounting to the front of a vehicle and including a pair of spaced apart lifting arm attachment points and a hydraulic lifting ram, and;

hayroll spear first end attachment means and lifting ram attachment means respectively adapted to secure said spear pivotally and removably to said lifting arm attachment points and to said hydraulic lifting ram of said headgear structure, said lifting ram attachment means for said spear comprises a pair of substantially identical lifting ram attachment plates, with each of said attachment plates having a first end and an opposite second end, with a first passage and a second passage formed therethrough respectively adjacent said first end and said second end, a first pin disposed through each said first passage of said plates and through said second passage of said spear with said spear being sandwiched between said attachment plates, and, said lifting ram having an uppermost end with a lateral passage therethrough, with a second pin disposed through each said second passage of said plates and said lifting ram lateral passage with said lifting ram being pivotally sandwiched between said attachment plates, whereby;

said snowplow headgear structure is mounted to the front of a vehicle, said spear is removably and pivotally secured to said lifting arm attachment points and said lifting ram of said headgear structure respectively by said first and said second lateral passages of said spear, and said spear is used to penetrate and impale a hayroll by means of maneuvering the vehicle accordingly, with the hayroll being lifted from an underlying surface for transport by the vehicle by arcuately lifting said spear by means of said hydraulic lifting ram of said snowplow headgear structure.

5. The hayroll handling device and vehicle attachment and lifting structure combination of claim 4, wherein:

said hayroll spear first end attachment means comprises a pin disposed through said lifting arm attachment points of said snowplow headgear structure and through said first lateral passage of said spear, with said spear being pivotally sandwiched between said lifting arm attachment points of said snowplow headgear structure.

6. The hayroll handling device and vehicle attachment and lifting structure combination of claim 4, wherein:

said spear has a length of substantially fifty two inches including said tapered point thereof.

7. The hayroll handling device and vehicle attachment and lifting structure combination of claim 4, wherein:

said spear is formed of elongate stock selected from the group consisting of hollow tubular material having a cylindrical cross section, solid rod material having a cylindrical cross section, hollow tubular material having a rectangular cross section, and solid rod material having a rectangular cross section.

8. A method of adapting and using a hydraulically actuated, vehicle mounted snowplow apparatus as a hayroll handling device, with the method comprising the following steps:

(a) providing a vehicle mounted snowplow apparatus having at least a headgear portion with a hydraulically actuated ram and hydraulic power pack therefor, a snowplow blade lifting arm, and a lifting arm attachment point;

(b) further providing an elongate hayroll spear having a first end, an opposite second end, a first lateral passage through the spear and adjacent the first end and a second lateral passage through the spear near the first end and displaced from the first lateral passage, and with the second end of the spear having a tapered point thereon and being adapted for the penetration and impaling of a hayroll thereon;

(c) further providing hayroll spear attachment means adapted to secure the hayroll spear pivotally to the snowplow apparatus respectively at the spear first passage and the lifting arm attachment point of the headgear portion of the snowplow apparatus, and at the spear second passage and hydraulically actuated ram of the snowplow apparatus;

(d) removing the snowplow blade lifting arm from the snowplow apparatus, and;

(e) pivotally securing the hayroll spear to the snowplow apparatus respectively at the spear first passage and the lifting arm attachment point of the snowplow apparatus headgear portion, and at the spear second passage and hydraulically actuated ram.

9. The method of adapting and using a hydraulically actuated, vehicle mounted snowplow apparatus as a hayroll handling device according to claim 8, including the steps of:

(a) providing a hayroll;

(b) maneuvering the vehicle to cause the hayroll spear to penetrate and impale the hayroll thereon;

(c) lifting the hayroll spear and hayroll impaled thereon by means of the hydraulically actuated ram;

(d) further maneuvering the vehicle with the hayroll being supported thereby by means of the lifted hayroll spear, to transport the hayroll to another location as desired;

(e) lowering the hayroll spear to allow the hayroll impaled thereon, to rest on an underlying surface, and;

(f) maneuvering the vehicle to withdraw the hayroll spear from the hayroll.

\* \* \* \* \*